United States Patent

Swain

[15] 3,666,207

[45] May 30, 1972

[54] SHIFTABLE SPINDLE FOR TAPE TRANSPORT

[72] Inventor: William W. Swain, Mountain View, Calif.

[73] Assignee: Cartridge Television, Inc., New York, N.Y.

[22] Filed: June 26, 1970

[21] Appl. No.: 50,244

[52] U.S. Cl. .......... 242/197, 274/11 D

[51] Int. Cl. .......... G03b 1/04, G11b 15/32, G11b 23/04

[58] Field of Search .......... 242/197–200, 195; 274/4 D, 4 E, 4 F, 11 D

[56] References Cited

UNITED STATES PATENTS

| | | | |
|---|---|---|---|
| 3,385,534 | 5/1968 | Staar | 242/198 |
| 3,514,050 | 5/1970 | Yamamoto et al. | 242/198 |

*Primary Examiner*—Leonard D. Christian

*Attorney*—Townsend and Townsend

[57] ABSTRACT

A shiftable spindle for receiving a tape reel of a tape cartridge when the latter is in an operative position relative to a base plate of a tape transport. The cartridge is received within a support having means for shifting the spindle as a function of the size of the cartridge.

13 Claims, 5 Drawing Figures

INVENTOR
WILLIAM W. SWAIN
BY
Townsend and Townsend

INVENTOR
WILLIAM W. SWAIN
BY
Townsend and Townsend

WILLIAM W. SWAIN
INVENTOR

BY

Townsend and Townsend

SHIFTABLE SPINDLE FOR TAPE TRANSPORT

This invention relates to improvements in tape transports and, more particularly, to a spindle construction for a tape transport for use in mounting a tape reel of a tape cartridge.

The primary object of this invention is to provide a shiftable spindle structure which cooperates with a carriage mechanism for a cartridge wherein the spindle structure is caused to shift when a cartridge of a particular size is received within the mechanism to thereby allow cartridges of different sizes to be used with the tape transport of which the spindle structure forms a part.

Another object of this invention is to provide an improved spindle assembly for a tape transport which accommodates itself for a particular size of tape cartridge by moving into alignment with the tape reel of a cartridge as a cartridge support moves the cartridge so that the cartridge approaches the spindle assembly.

Other objects of this invention will become apparent as the following specification progresses, reference being had to the accompanying drawings for an illustration of the invention.

Figure 1:
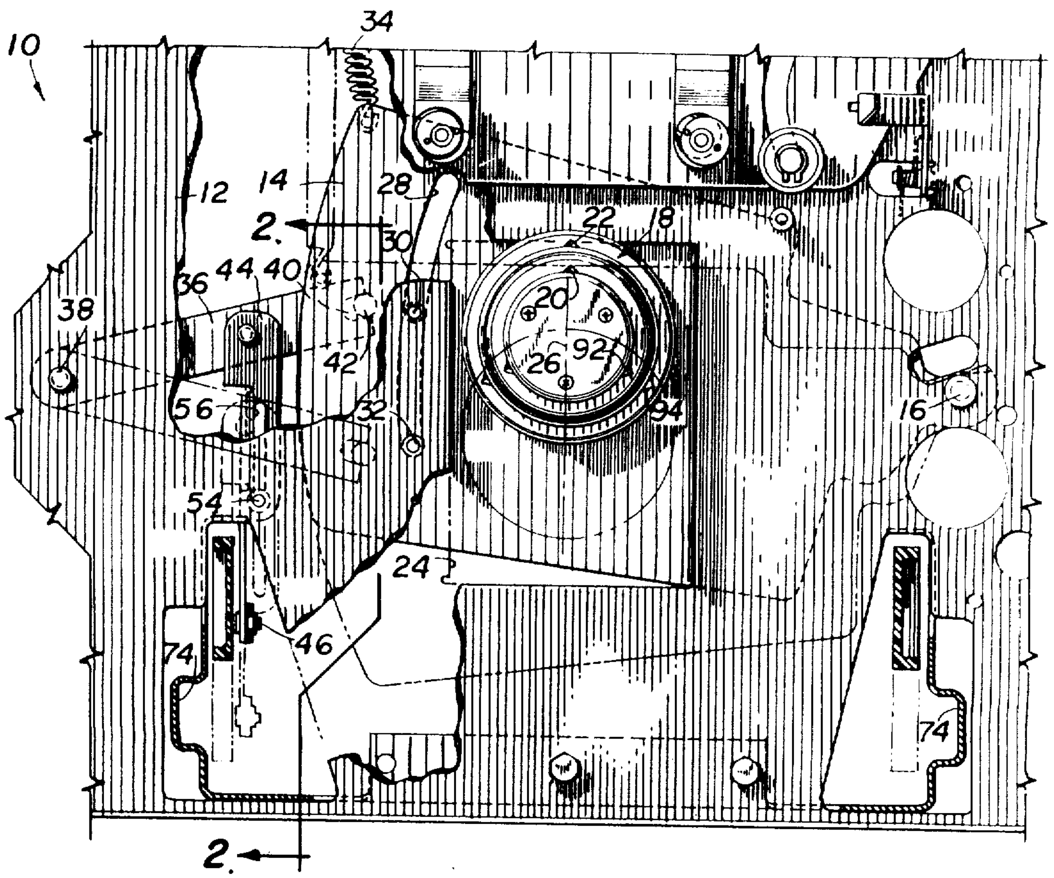
FIG. 1 is a front elevational view of the spindle structure forming a part of the present invention, showing the linkage for coupling the same to a cartridge support.

A tape transport 10 has a vertical base plate 12 to which a spindle shift plate 14 is pivotally mounted by a pin 16 for rotation about a generally horizontal axis. Spindle structure 18 on the shift plate includes a pair of rotors 20 and 22 of different diameters, the rotors being coupled with respective shafts (not shown) and being concentric and axially spaced relative to each other. The rotors extend through a central opening 24 in the base plate and are movable up and down between two operative positions, namely the full line position of FIG. 1 and the dashed line position thereof. In either position, the central axis of the rotors is on a vertical line 26. The shift plate has a slot 28 which receives a pair of spaced pins 30 and 32 secured to the base plate. These pins determine the upper and lower positions of the spindle rotors. A spring 34 coupled to the shift plate and to the base plate biases the shift plate upwardly.

A link 36 is pivoted on the base plate by a pin 38 and has a recess 40 for sliding engagement with a pin 42 on the shift plate. A second link 44 is pivoted to link 36 between the ends thereof and extends downwardly and is pivotally connected by a pin 46 (FIGS. 1 and 2) to an extension 48 (FIG. 2) on a shift arm 50. Pin 46 is slidably received within a slot 52 in extension 48 and a guide pin 54 on the base plate is received within a slot 56 in link 44 to guide the latter as it moves up and down.

Figure 5:
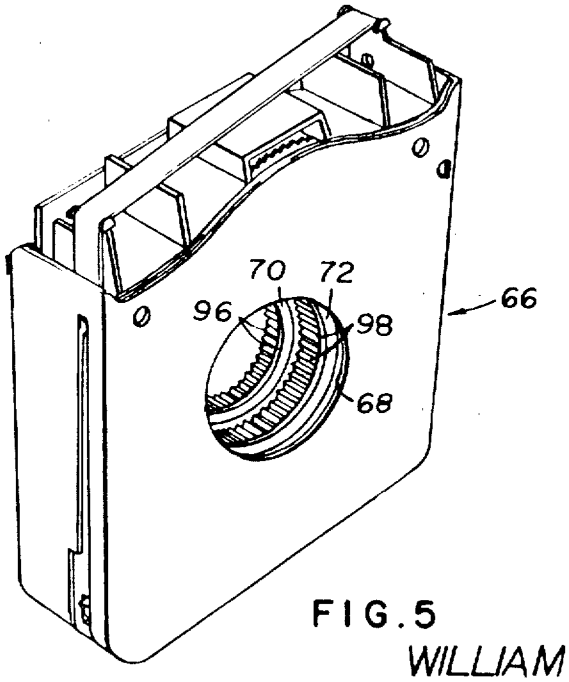

Shift arm 50 is pivotally mounted by a pin 58 on the side of a carriage mechanism 60 (FIG. 2) comprised of a receptacle or bucket 62 having a second receptacle or ejector 64 for receiving a cartridge 66 of the type shown in FIG. 5. The cartridge has a central hole 68 aligned with the open hubs 70 and 72 of a pair of generally axially aligned tape reels which are to be releasably connected to respective spindle rotors 20 and 22. Bucket 62 can pivot about the axis of pin 58 relative to a pair of side plates 74 from the inclined, full line position of FIG. 2 to the vertical, dashed line position.

Figure 4:
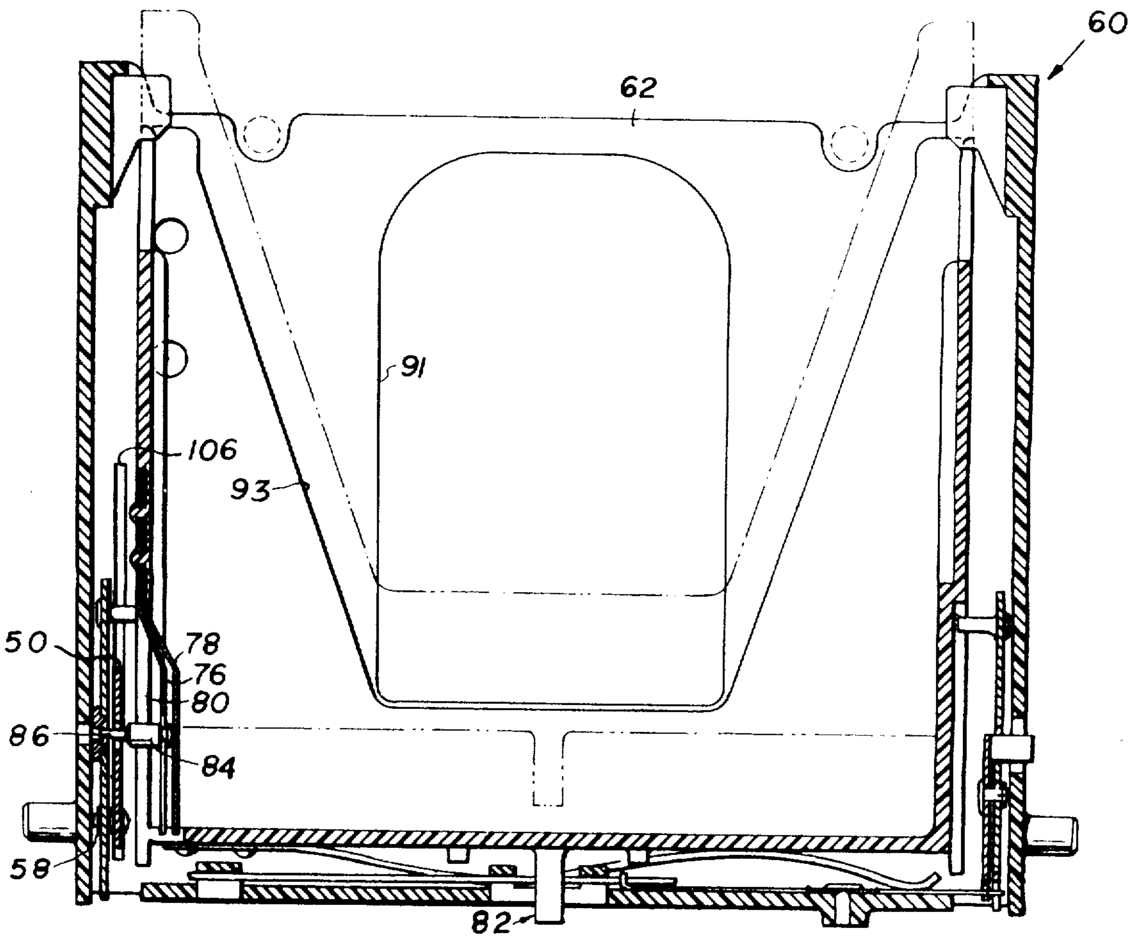
FIG. 4 is a vertical cross section of the cartridge support showing the way in which it is coupled to the linkage; and, FIG. 5 is a perspective view of a cartridge of the type usable with the present invention.

A pair of leaf springs 76 and 78 are secured to the outer surface of one side of ejector 64 and move into an opening 80 in such side when a cartridge of a relatively large size is inserted into the ejector and forced downwardly to cause the ejector to be releasably latched to the bucket by latch means 82 (FIG. 4). When the springs move into opening 80, they force a pin having an enlarged portion 84 and a reduced portion 86 to the left when viewing FIG. 4. The enlarged portion moves into an enlarged hole 88 at one end of a slot 90 of shift arm 50, the slot being concentric with pin 58. The enlarged portion 84 cannot move in slot 90; thus, bucket 62 is rigidly connected to shift arm 50 to cause the same to pivot in a clockwise sense viewing FIG. 2.

Figure 2:
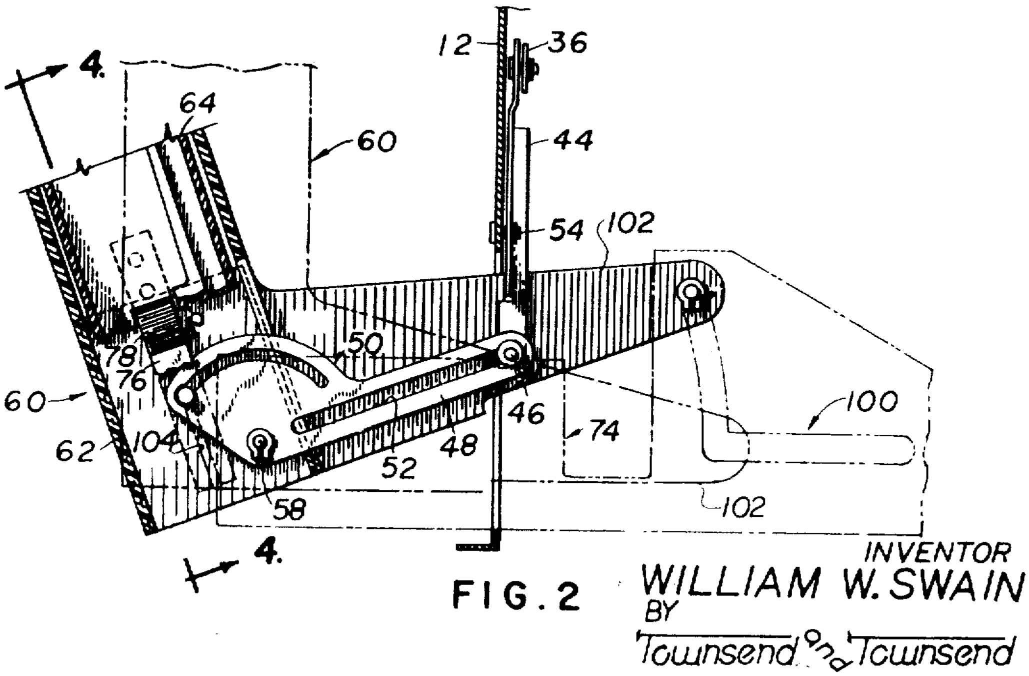
FIG. 2 is a fragmentary, side elevational view of the linkage and a portion of the cartridge support.
Figure 3:
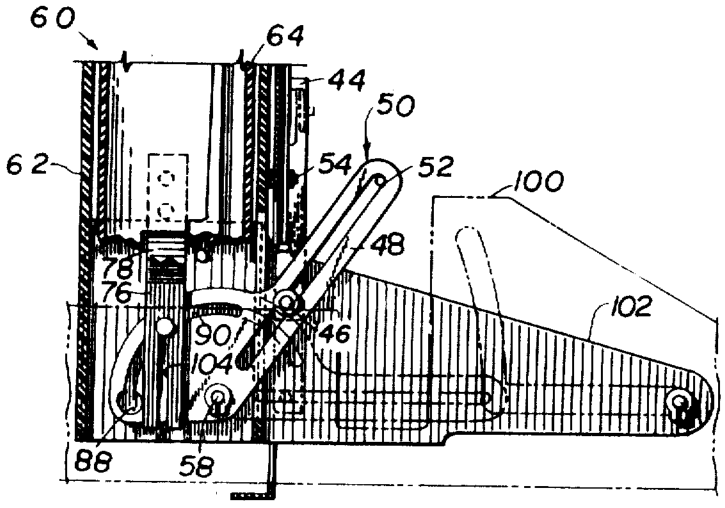
FIG. 3 is a view similar to FIG. 2 but showing another operative portion of the linkage.

When the bucket moves from its inclined position to its vertical position, assuming that the bucket carries a large size cartridge the movement causes shift plate 14 to be pulled downwardly so that rotors 20 and 22 are in the dashed line position of FIG. 1 in alignment with an opening 91 (FIG. 4) in the bucket and a recess 93 in the ejector. Thus, the bucket can be manually moved toward the base plate so that the spindle rotors can be received within hubs 70 and 72 of the cartridge. The rotors have spaced detents 92 and 94, respectively, for coupling with teeth 96 and 98 on the reel hubs. That is to say, the springs 76 and 78 sense the presence of a large size cartridge and clutch 84 into slot 90, so that clockwise movement of bucket 60 from the FIG. 2 position to the FIG. 3 position causes a vertically downward displacement of pin 46. This downward motion of pin 46 pulls link 44 downwardly which in turn swings link 36 clockwise and link 14 counterclockwise, vertically displacing the rotors downwardly. Track structure 100 (FIG. 2) guides a pair of extensions 102 on the bucket as it moves toward the base plate. The cartridge can thereby be moved into an operative position near the base plate so that the tape on the tape reels of a cartridge can be pulled out of the same and moved to a head assembly.

When the cartridge is removed from the ejector, pin portions 84 and 86 are moved to the right in FIG. 4 by the restoring force of spring 76 since the latter is coupled to portion 84 such as by providing an angular groove in the latter which receives the sides of the spring defined by a slot 104. Shift arm 50 extends out of the bucket through a slot 106.

If a relatively small cartridge is received in the ejector, it does not force springs 74 and 76 to the left, viewing FIG. 4. Thus, pin portion 86 remains in slot 90 and can move relative thereto. Thus, the bucket is not connected to shift arm 50 and does not cause downward movement of shift plate 14 when the bucket moves into its vertical position. However, shift plate 50 pivots into the position shown in FIG. 3 relative to the bucket by virtue of the connection of pin 46 and extension 48. That is to say, in the case of a relatively small cartridge clockwise swinging motion of the bucket 62 (FIG. 2) causes pin portion 82 to slide freely within slot 90. As the bucket moves clockwise as determined by track 100, pin 46 slides freely in slot 52 so that there is no downward thrust on line 44. As the bucket moves clockwise link 50 turns counterclockwise from the FIG. 2 to the FIG. 3 position. In other words, in the presence of a small cartridge the link 50 does not mechanically couple the bucket to the link 44.

Subject matter disclosed, but not claimed herein, is claimed in various ones of the following copending U.S. Pat. applications, assigned to the same assignee as the present application and filed on the same day, June 26, 1970: as to the apparatus generally, including the bucket, U.S. Pat. application Ser. No. 50,059, Richard A. Hathaway, entitled "Tape Transport Apparatus;" as to the shiftable tape pick-up elements, U.S. Pat. application Ser. No. 50,245, William W. Swain and Richard A. Hathaway, entitled "Drive for Tape Guides of Tape Transport;" as to the spindles, U.S. Pat. application Ser. No. 50,204, Richard A. Hathaway, entitled "Spindle Construction for Tape Transport;" as to the cartridge, U.S. Pat. application Ser. No. 50,125, William W. Swain, "Tape Cartridge."

What is claimed is:

1. In a tape transport: a base plate; a shift plate pivotally mounted on the base plate and having spindle structure thereon for movement therewith from one operative position to a second operative position; means biasing the shift plate into one of said positions; a support for mounting a cartridge for movement adjacent to the base plate so that the spindle structure can be received within the cartridge and coupled to a tape reel therein; a linkage shiftably connected to the support and coupled with the shift plate for moving the latter into the other operative position when the linkage moves with the support; and means responsive to the size of a cartridge on the support for rigidly connecting the linkage thereto, whereby the shift plate can be moved into said other operative position when the support moves relative to the base plate.

2. In a tape transport as set forth in claim 1, wherein said connecting means includes an arm pivotally mounted on the support and coupled to the linkage, said arm having an opening therein and a pin movable into the opening of the arm to prevent relative movement between the support into the arm when a cartridge of a particular size is received within the support and as the support moves relative to the base plate.

3. In a tape transport as set forth in claim 2, wherein said opening is at one end of a slot and is enlarged relative thereto, said slot being concentric to the axis about which the arm pivots relative to the support, and means biasing the pin away from said opening.

4. In a tape transport as set forth in claim 2, wherein is included a spring in the path of movement of a cartridge onto the support for moving the pin into the opening of said arm, said support being movable from an inclined position to a vertical position and then along a rectilinear path toward the base plate.

5. In a video reproducer and/or recorder the combination of:

a base plate; a bucket adapted individually to receive cartridges of various sizes, each cartridge having a reel including a driven element;

mounting structure for moving said bucket between ready and operative positions with respect to the base plate;

a spindle drive;

an adjustable mount for the spindle drive so arranged that the position of the spindle may be adjusted in elevation relative to the base plate;

a sensing device which responds to the insertion of a cartridge of one size in the bucket but is non-responsive to the insertion of a cartridge of another size; and a linkage which is controlled by the sensing device to determine the position of said spindle so that when the bucket is moved into operative position the spindle drive registers with the driven element of the cartridge.

6. The combination according to claim 5 and further comprising a spring which normally biases the spindle mount into its elevated position, the sensing device being arranged to be non-responsive to the presence of a relatively short cartridge, the linkage between the sensing device and the spindle mount therefore remaining open, so that as the bucket is placed in operating position the spindle drive remains in elevated position to register with the driven element of the relatively short cartridge.

7. The combination according to claim 6 wherein said linkage includes a clutch and said sensing device responds to the insertion of a relatively long cartridge in the bucket to close said clutch so that movement of the bucket toward operating position actuates said linkage to depress the spindle drive into its lower position, whereby the spindle drive registers with the driven element of the relatively long cartridge as the bucket reaches operating position.

8. The combination according to claim 7 wherein the sensing device comprises a spring positioned in the bucket to be mechanically stressed by a long cartridge but to be out of the path of a short cartridge, and the clutching device comprises a pin actuated by said spring to close said clutch and a link pivotally mounted on the bucket so that when it is closed it turns with the bucket.

9. In a tape transport:

a base plate;

a shift plate pivotally mounted on the base plate and having a spindle drive thereon for movement therewith from one operative position to a second operative position;

a spring for biasing the shift plate into one of said positions;

a carriage for mounting a cartridge for movement relative to the base plate so that the spindle structure can be received within the cartridge and coupled centrally to a tape reel therein;

a linkage capable of being clutched to the carriage and coupled to the shift plate for moving the latter into the other operative position when the linkage moves with the carriage; and a clutch responsive to one size of a cartridge on the carriage for coupling the linkage to the carriage.

10. In a tape transport, the combination according to claim 9, wherein said linkage includes an arm pivotally mounted on the carriage and coupled to the shift plate, said arm having an opening therein, and the clutch comprises a pin movable into the opening of the arm to prevent relative movement between the carriage and the arm as the carriage moves relative to the base plate, said pin moving into said opening when a cartridge of a particular size is received within the carriage.

11. In a tape transport, the combination according to claim 10, wherein said opening is at one end of a slot and is enlarged relative thereto, said slot being concentric to the axis about which the arm pivots relative to the carriage, the pin being normally biased away from said opening.

12. In a tape transport, the combination as set forth in claim 10, wherein is included a spring in the path of movement of a cartridge within the carriage for moving the pin into the opening of said arm.

13. In a tape transport:

a base plate, reel-driving spindle structure mounted on the base plate for movement from a first operative position to a second operative position, a cartridge support shiftably mounted on the base plate, and means coupling said support to said spindle means for shifting the latter from the first operative position to the second operative position during movement of the support relative to the base plate, said coupling means including a linkage shiftably mounted on the support, and means on the support for contingently coupling the linkage thereto as a function of the size of a cartridge on the support.

* * * * *